United States Patent
Pell et al.

[11] Patent Number: 6,055,692
[45] Date of Patent: May 2, 2000

[54] BOARDING BRIDGE FOR COMMUTER TYPE AIRCRAFT OR THE LIKE

[75] Inventors: Richard A. Pell, Arlington, Tex.; Luc Fafard, Ville Ste. Catherine, Canada

[73] Assignee: Accessair Systems, Inc., Quebec, Canada

[21] Appl. No.: 09/027,807

[22] Filed: Feb. 23, 1998

Related U.S. Application Data

[60] Provisional application No. 60/038,257, Feb. 24, 1997.

[51] Int. Cl.$^7$ .................................................. E01D 15/00
[52] U.S. Cl. ............................................................ 14/71.5
[58] Field of Search .................................... 14/71.5, 72.5

[56] References Cited

U.S. PATENT DOCUMENTS

| | | |
|---|---|---|
| 2,701,068 | 2/1955 | Douglas et al. . |
| 3,121,243 | 2/1964 | Phillips . |
| 3,123,167 | 3/1964 | Lichti . |
| 3,184,772 | 5/1965 | Moore et al. . |
| 3,317,942 | 5/1967 | Wollard et al. . |
| 3,588,934 | 6/1971 | Van Marle . |
| 3,641,604 | 2/1972 | Eggert, Jr. ..................................... 14/71 |
| 3,816,867 | 6/1974 | Shirzad et al. . |
| 3,883,918 | 5/1975 | Magill . |
| 4,120,067 | 10/1978 | Hone et al. ............................... 14/71.5 |
| 4,122,958 | 10/1978 | Anderberg ................................... 135/5 |
| 4,559,660 | 12/1985 | Lichti ....................................... 14/71.5 |
| 5,394,583 | 3/1995 | Plate . |
| 5,524,318 | 6/1996 | Thomas . |

FOREIGN PATENT DOCUMENTS

| | | |
|---|---|---|
| 1 467654 | 1/1967 | France . |
| 2 539705 | 7/1984 | France . |
| 2 667045 | 3/1992 | France . |
| 297 03 885 U1 | 8/1997 | Germany . |

*Primary Examiner*—Eileen Dunn Lillis
*Assistant Examiner*—Raymond Addie
*Attorney, Agent, or Firm*—Birch Stewart Kolasch & Kolasch & Birch LLP

[57] ABSTRACT

A telescopic boarding bridge mounted at ground level for bridging the space between a small aircraft and a terminal gate doorway. The bridge includes a terminal bridge section supported in a fixed position adjacent the terminal gate doorway and at least one moveable bridge section adapted to slidably receive a front end of the terminal bridge section. The moveable bridge section has idler wheels for allowing movement thereof on the ground. A drive mechanism is operational to selectively push and pull on each side of the moveable bridge section to linearly displace the same relative to the terminal bridge section. The telescopic boarding bridge further includes a flexible canopy enclosure which is displaceable between a retracted position for providing wing tip clearance and an extended position for covering the doorway and the sides of the stairs of a small aircraft.

21 Claims, 11 Drawing Sheets

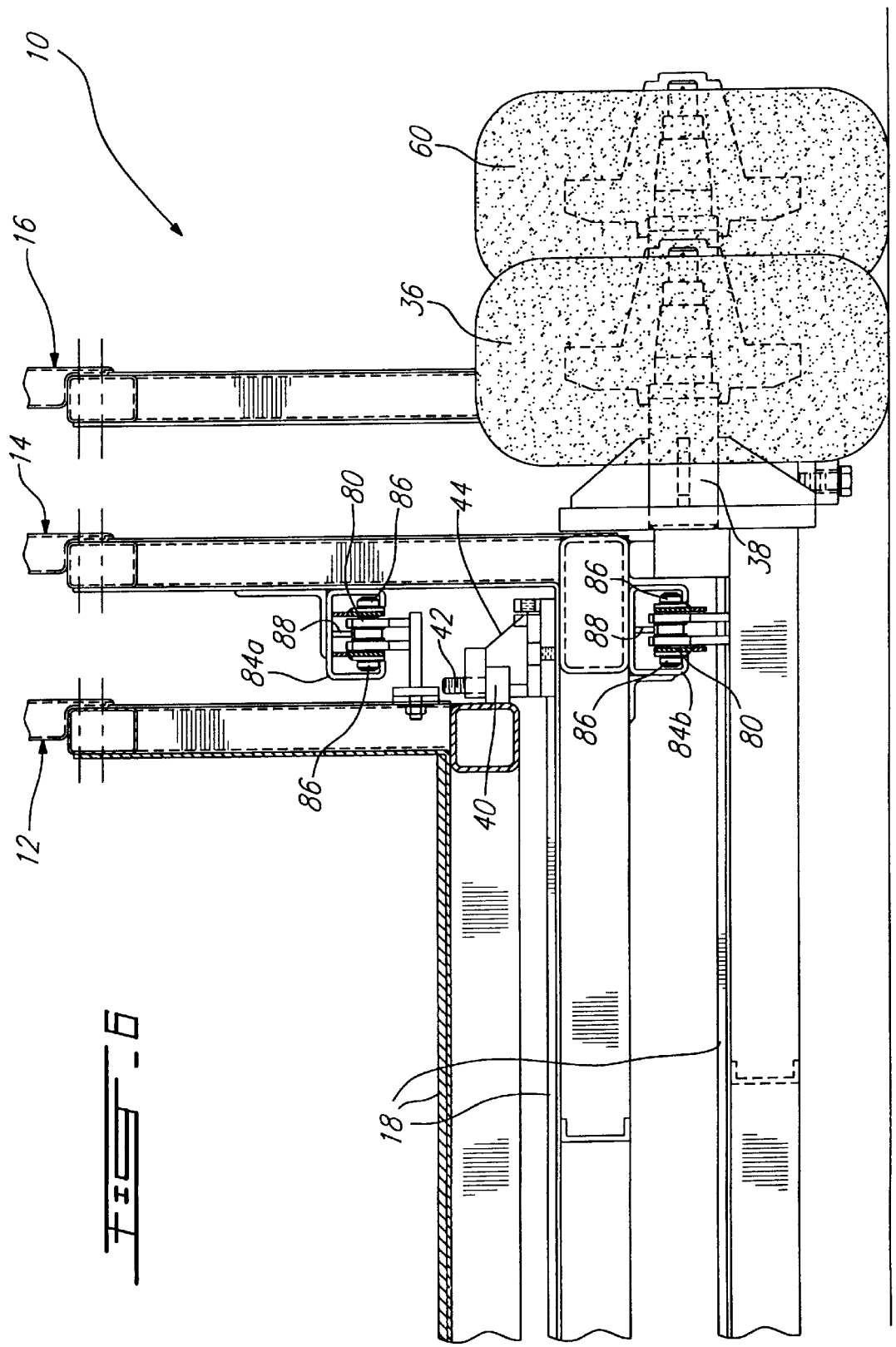

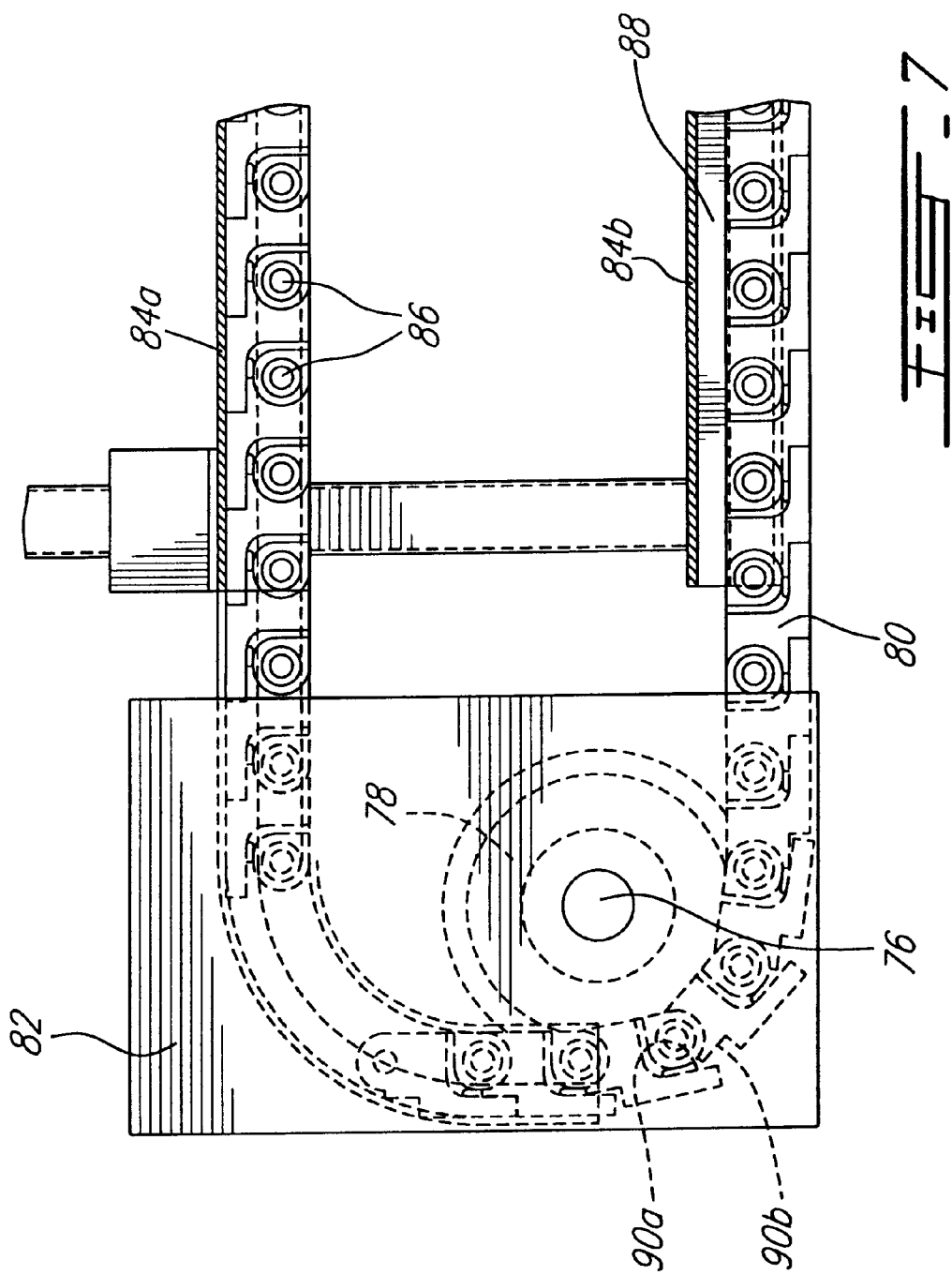

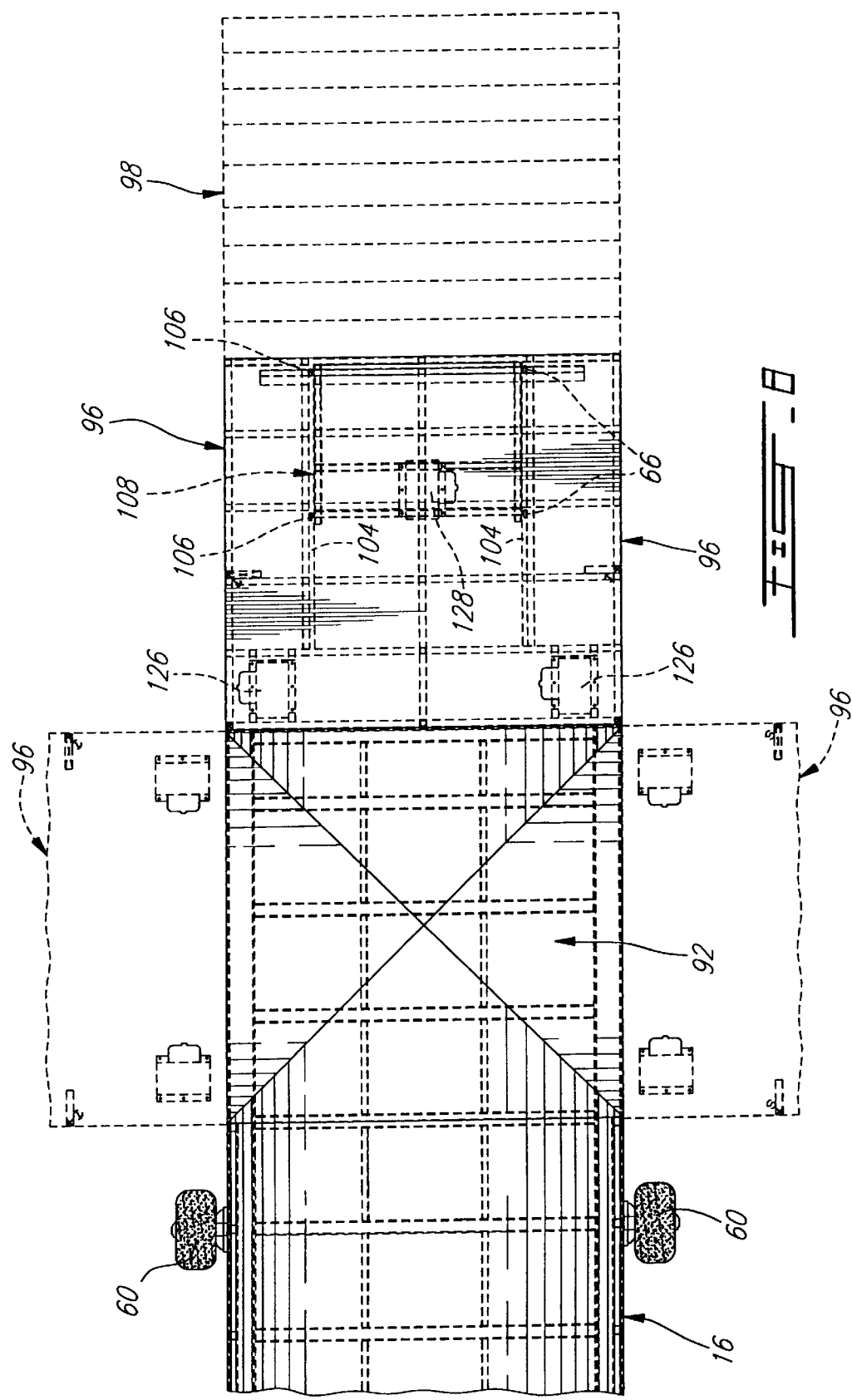

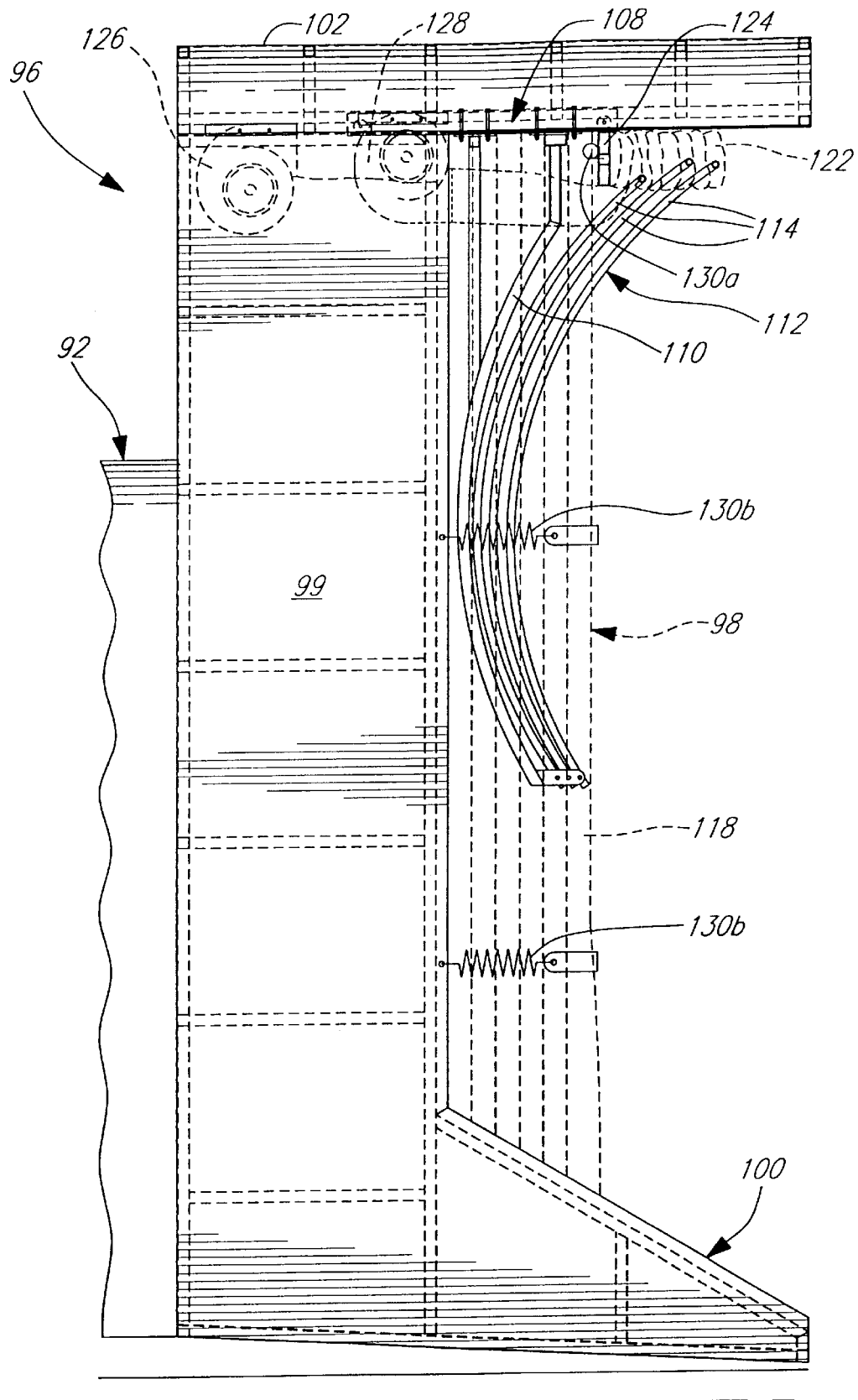

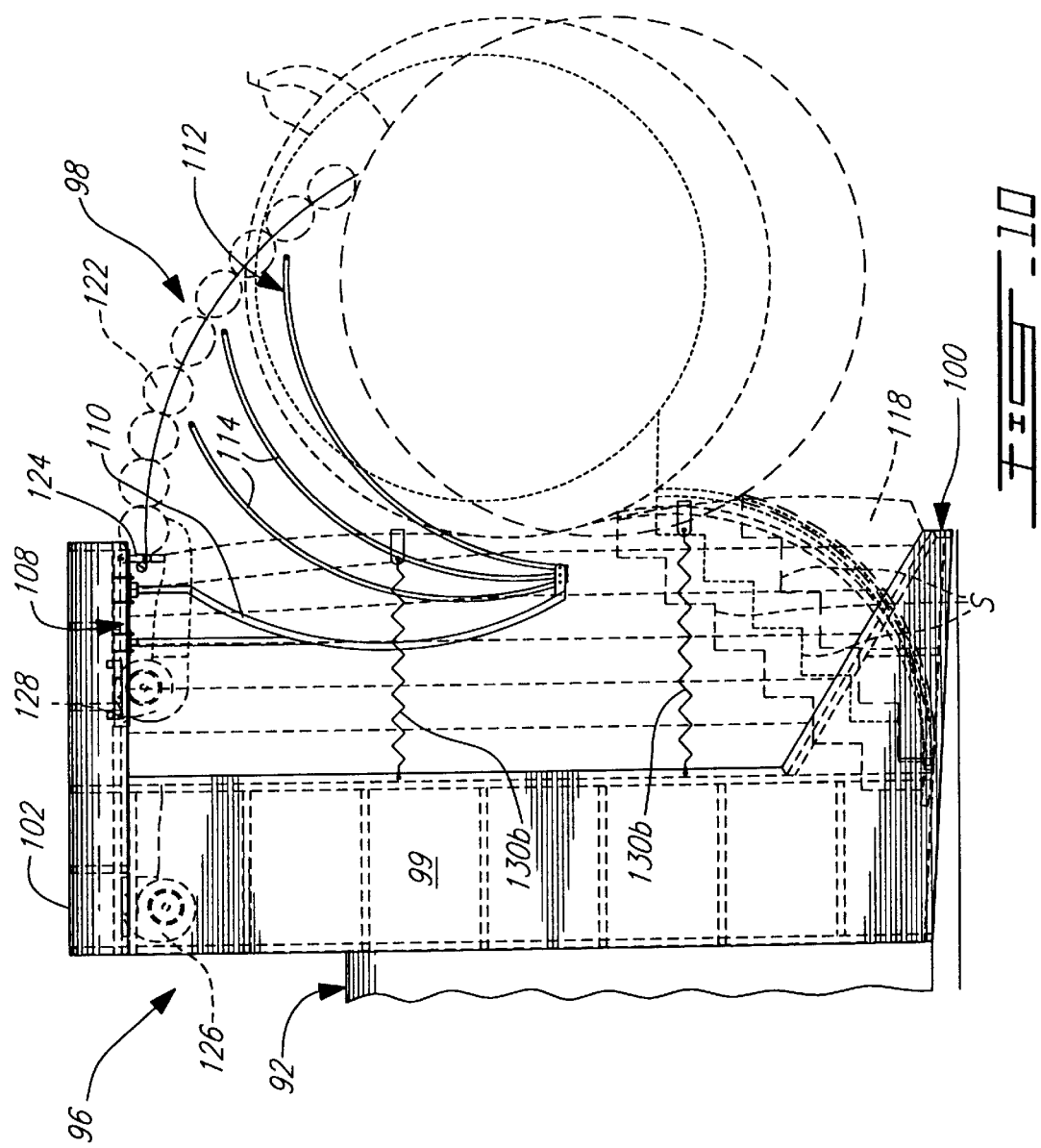

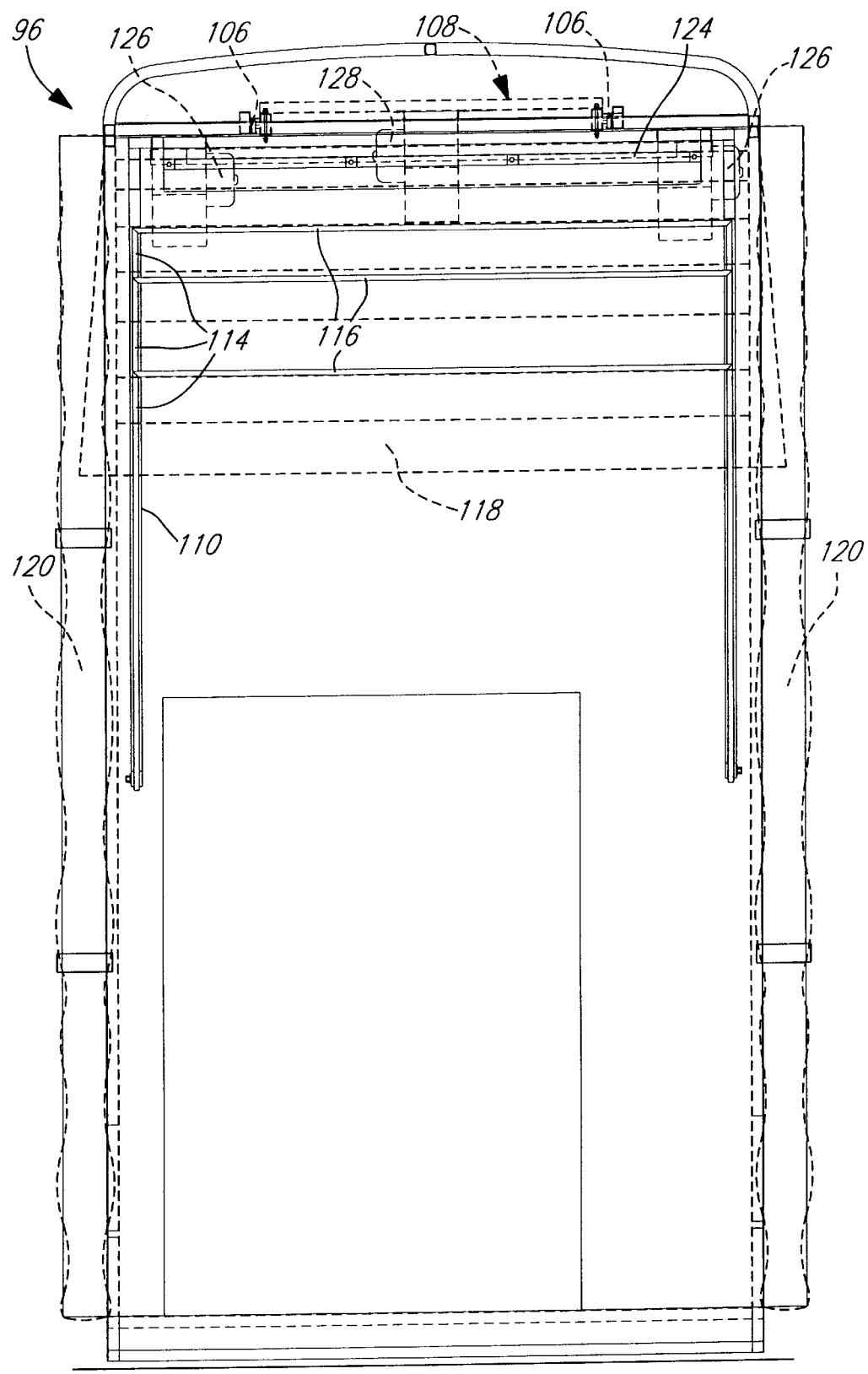

BOARDING BRIDGE FOR COMMUTER TYPE AIRCRAFT OR THE LIKE

RELATED APPLICATIONS

This application claims benefit of U.S. Provisional Application Ser. No. 60/038,257 filed on Feb. 24, 1997.

BACKGROUND OF THE INVENTION

1. Field of the Invention

The present invention relates to a boarding bridge and, more particularly, pertains to a boarding bridge intended primarily for use with small aircraft or the like.

2. Description of the Prior Art

Conventional passenger boarding bridges for large jet aircraft are well known in the art as illustrated by U.S. Pat. No. 3,123,167 issued to Lichti on Mar. 3, 1964 and U.S. Pat. No. 3,317,942 issued to Wollard et al. on May 9, 1967. Typically, such passenger boarding bridges comprise at least two telescopic bridge sections mounted at an elevation above ground level for bridging the space between a doorway in the fuselage of a large aircraft and the second floor in an airport terminal building. The telescoping bridge may be supported by a vertically extensible and contractible, self-propelled, steerable vehicle which is also operational to extend and contract the telescoping bridge. Alternatively, conventional telescoping boarding bridges may be displaced along an elevated horizontal trackway by operation of a cylinder mounted at a first end thereof to a rear fixed bridge section and at opposed end thereof to a front telescoping bridge section of the boarding bridge.

Such conventional passenger boarding bridges are relatively large in size and height and thus they are not generally practicable for use with small aircraft such as commuter aircraft. Moreover, large aircraft have doors that open to one side, whereas small or commuter aircraft are generally equipped with doors that swing down and have steps and handrails integrally set on the back thereof. Thus conventional passenger boarding bridges are not well adapted to mate with the fuselage of commuter aircraft since they cannot fit around the doorways thereof.

Some characteristics are peculiar to commuter aircraft, such as the location of the passenger door which is relatively close to the wings, requiring an optimization of the extension and retraction distance to allow sufficient aircraft wing clearance during parking and departure manoeuvres of a given commuter aircraft.

Accordingly, various solutions have been proposed so that passengers, enplaning or deplaning from small aircraft might avoid walking directly on the airport tarmac and to protect them from the elements such as rain, hail, sleet, snow and wind. For instance, U.S. Pat. No. 5,524,318 issued to Thomas on Jun. 11, 1996 discloses an aircraft loading adapter for bridging between a small aircraft and a conventional boarding bridge ordinarily employed with standard size aircraft. The aircraft loading adapter comprises a pair of independent actuable vertical supports which extend upwardly from a mobile platform and connect at an upper end thereof with the underside of a rear telescoping bridge section of an enclosed bridge structure to provide vertical adjustment of the ends of the latter. The rear end of the rear telescoping bridge section is provided with a curved surface which is conformed to the front end of a conventional boarding bridge and is pivoted about a horizontal axis. The bridge structure further includes a front telescoping bridge section having a front extension which is adapted to mate with the fuselage of a small aircraft. In operation, each vertical support is independently activated to align the front extension of the front telescoping bridge section with the entry/exit hatch of the small aircraft. According to a second embodiment, one of the actuable vertical supports is replaced by a vertical supporting member which is pivotally connected at an upper end thereof to the underside of the rear telescoping bridge section.

It is also know to provide the front end of a boarding bridge with extensible and retractable forward portions for covering the aircraft doorways. U.S. Pat. No. 3,588,934 issued to Van Marle on Jun. 29, 1971 discloses a conventional boarding bridge having an end section which includes side members pivotally mounted for rotation about an axis coinciding with the front lower edge of the section. Hydraulic jacks are provided to pivot the side members. A roof is secured to the upper ends of the side members for movements therewith.

Basically, the extensible and retractable forward portion described in the above-mentioned patent is intended for sheltering the doorway of conventional aircraft and is thus not well adapted for covering the door opening and stairs of a small aircraft.

SUMMARY OF THE INVENTION

It is therefore an aim of the present invention to provide a boarding bridge for use with small aircraft of the type generally known as commuter aircraft.

It is also an aim of the present invention to provide a boarding bridge which is adapted to extend and retract in a linear direction.

It is further an aim of the present invention to provide a boarding bridge which travels at ground level and which is adapted to operate on a wet, ice or snow covered tarmac and still maintain a rectilinearly controlled movement.

It is a further aim of the present invention to improve safety and to protect passengers from hazards on a tarmac by limiting the direction of movement of the passengers and to protect them against inclement weather.

It is a further aim of the present invention to provide a boarding bridge having an extension and retraction capability, to allow sufficient aircraft wing clearance during parking and departure manoeuvers of a small aircraft.

It is a further aim of the present invention to provide a drive mechanism which is adapted to facilitate rapid retraction and extension of a telescopic boarding bridge.

It is yet another aim of the present invention to provide a boarding bridge which is adapted to mate with the fuselage of a variety of commuter aircraft.

It is still an aim of the present invention to provide an extensible and retractable canopy enclosure for sheltering the stairs of a small aircraft.

Finally, it is an aim of the present invention to provide a boarding bridge which is relatively simple and inexpensive to manufacture, easy to construct, install, operate, maintain and repair.

Therefore, in accordance with the present invention, there is provided a telescopic boarding bridge for bridging, at ground level, the space between a doorway of a small aircraft and a terminal gate doorway, comprising a terminal bridge section supported in a stationary position adjacent said gate doorway, at least one moveable bridge section telescopically related to said terminal bridge section and displaceable in a linear direction between an extended and a retracted position said moveable bridge section being only supported on a ground surface by idler runner means to enable said linear displacement thereof at a level proximal the ground surface, and drive means operational to selectively push and pull said moveable bridge section relative to said terminal section to effect extention and retraction thereof.

In another aspect of the present invention, a boarding bridge for commuter type aircraft is provided comprising an elongated substantially enclosed bridge structure extending at ground level from a terminal gate doorway to a hatch of a small aircraft, said bridge structure having a front floor portion which provides a surface substantially level with a bottom portion of a set of stairs of a small aircraft, and a front end section displaceable between a retracted position and an extended position sheltering a portion of sides of the aircraft stairs and the aircraft hatch.

In a still further aspect of the present invention, a boarding bridge end section for engaging with an aircraft fuselage, is provided comprising a carrier member displaceably mounted to a structure of the boarding bridge end section for longitudinal movements with respect thereto, a canopy enclosure means supported by said carrier member and displaceable relative to said carrier member between retracted and extended positions where said canopy enclosure means is respectively out of engagement and engaged with an aircraft fuselage, and power means operational to displace the carrier member and said canopy enclosure means.

In a still further aspect of the present invention, there is provided a telescopic boarding bridge having a terminal bridge section supported in stationary position, an intermediate bridge section mounted in a telescopically mating relationship with said terminal bridge section, and a front bridge section mounted in telescopically mating relationship with said intermediate bridge section; a drive assembly is mounted to said intermediate bridge section for retracting and extending telescopic boarding bridge in a linear direction, said drive assembly comprising at least one axially extending elongated channel means mounted to said intermediate bridge section, at least one push-pull flexible elongated drive member adapted to be slidably engaged in said elongated channel means for longitudinal movement therein, said push-pull flexible elongated drive member being connected at a first end portion thereof to said terminal bridge section and at a second end portion thereof to said front bridge section, and motor means connected to said push-pull flexible elongated drive member for displacing said push-pull flexible elongated drive member thereby forcing a linear movement of said intermediate and front bridge sections in a direction dependent on that of the motor means.

BRIEF DESCRIPTION OF THE DRAWINGS

Having thus generally described the nature of the present invention, reference will now be made to the accompanying drawings, showing by way of illustration a preferred embodiment thereof, and in which:

FIG. 6 is an enlarged cross-sectional view taken along lines 6—6 of FIG. 2;

FIG. 7 is an enlarged, fragmentary, side elevational view of a drive mechanism of the telescopic boarding bridge in accordance with the present invention;

FIG. 8 is an enlarged top plan view of a front end of the telescopic boarding bridge illustrating the possibilities of mounting the front end section supporting the canopy enclosure in line with the telescopic boarding bridge and, in dotted lines, alternative positions thereof;

FIG. 9 is a side elevational view of the front end section of the telescopic boarding bridge showing the canopy enclosure in a retracted position thereof;

FIG. 10 is a side elevational view of the front end section of the telescopic boarding bridge showing the canopy enclosure in an extended position thereof for covering the hatch and the sides of the stairs of a commuter type aircraft; and FIG. 11 is a front end elevational view of the front end section of the telescopic boarding bridge.

DESCRIPTION OF THE PREFERRED EMBODIMENTS

Figure 1:
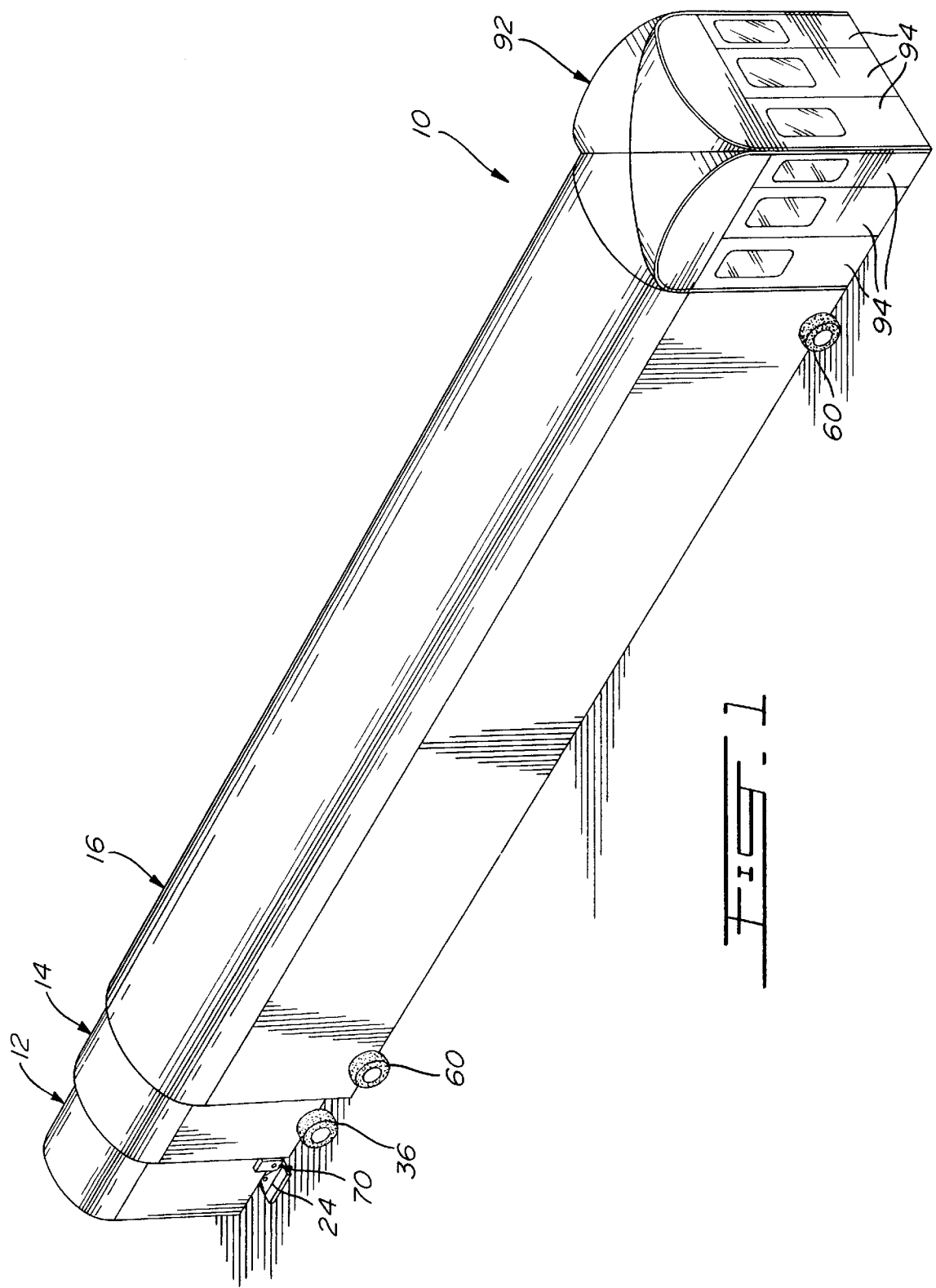
FIG. 1 is a perspective view of a telescopic boarding bridge in accordance with the present invention illustrated in a retracted position thereof.

Now referring to the drawings, and in particular to FIG. 1, a telescopic boarding bridge in accordance with the present invention and generally designated by numeral 10 will be described.

The telescopic boarding bridge 10, as will be explained hereinafter, travels at ground level in a linear direction to bridge the space between a commuter type aircraft and a point of embarkation and debarkation such as a ground level doorway of a terminal gate in an airport terminal building. The telescopic boarding bridge 10 defines an enclosed passageway which provides weather-proof shelter for the protection of the passengers walking therethrough. The telescopic boarding bridge 10 also prevents the passengers from walking on the airport tarmac, thereby providing security for the airport and safety for the passengers.

Referring more specifically to the FIGS. 1 to 7, the telescopic boarding bridge 10 generally comprises a terminal bridge section 12 supported in fixed position adjacent a terminal building or the like, an intermediate bridge section 14 telescopically mounted to the terminal bridge section 12, and a front bridge section 16 telescopically mounted to the intermediate bridge section 14. The terminal, intermediate and front bridge sections 12, 14 and 16 progressively increase in size so that the intermediate bridge section 14 slidably receives a front end portion of the terminal bridge section 12 and the front bridge section 16 slidably receives a front end portion of the intermediate bridge section 14.

Each bridge section 12, 14 and 16 has a floor 18, a roof 20 and side walls 22. The floor 18 and the bottom portions of the side walls of each bridge section 12, 14 and 16 are made of steel, whereas the upper portion of the side walls 22 and the roof 20 thereof are made of fiberglass panels filled with a structural composite foam such as NIDA-CORE* or urethane. The bridge sections 12, 14 and 16 have a weather seal between them to prevent egress of wind, snow, rain or the like. All bridge sections 12, 14 and 16 include handrails 23 along the interior sides thereof.

Each handrail 23 consist of an extruded elongated member defining a longitudinal channel 25 in which a plurality of eyelets or the like are mounted for electrical cables to pass through in a festoon like-manner for allowing the same to extend and retract with the telescopic boarding bridge 10. The telescopic boarding bridge 10 is connected to the terminal building power via a water-tight power plug and receptacle.

Figure 4:
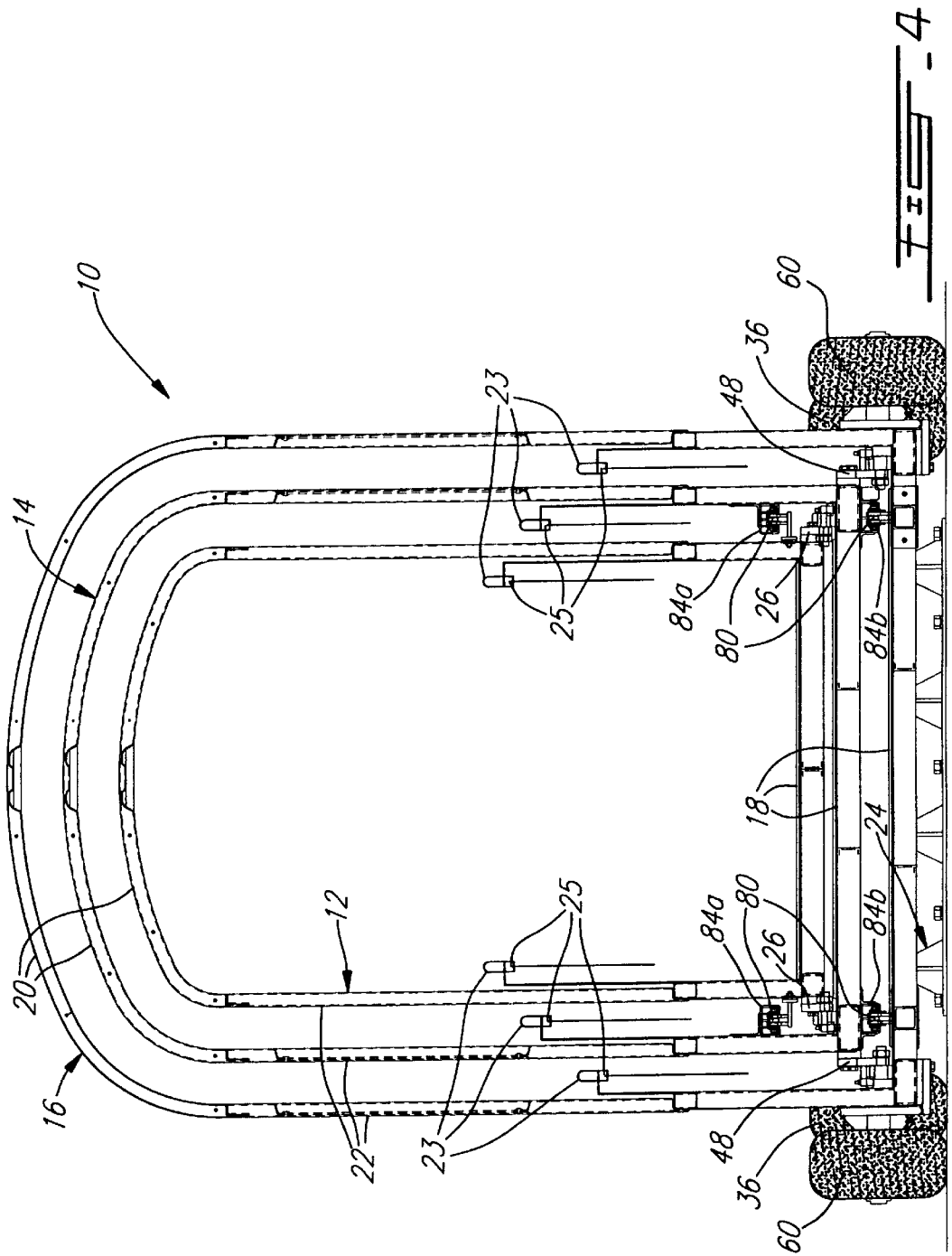
FIG. 4 is a front elevational view of the telescopic boarding bridge with the front portion thereof omitted for clarity.
Figure 5:
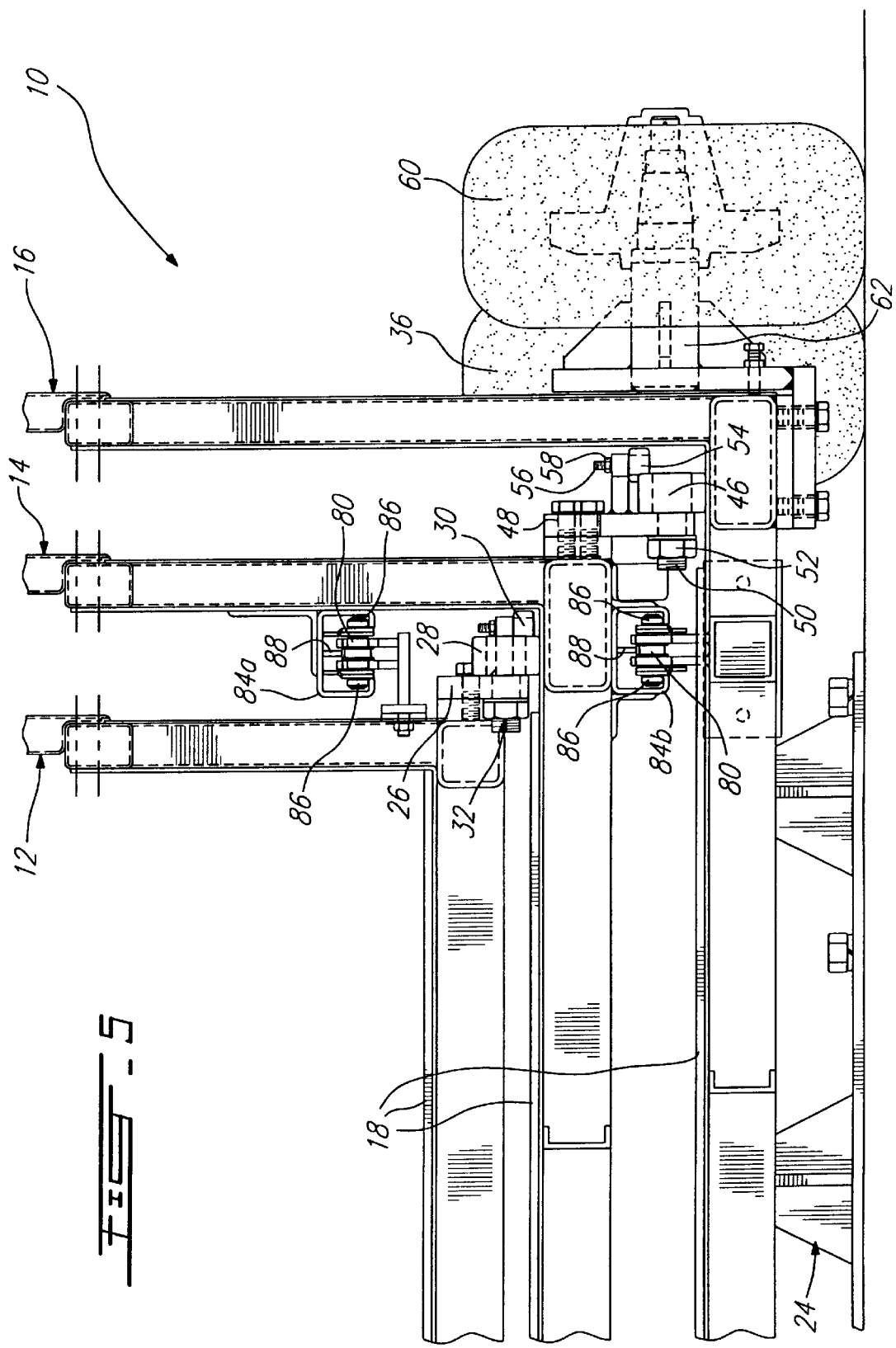
FIG. 5 is an enlarged cross-sectional view taken along lines 5—5 of FIG. 2.

More specifically, the terminal bridge section 12 is mounted at a rear end thereof to a plurality of support members 24 secured to a foundation. As seen in FIGS. 4 and 5, a pair of brackets 26 is mounted to a front end of the terminal bridge section 12 on opposite sides thereof. A roller 28 is mounted to each bracket 26 for supporting the front end of the terminal bridge section 12 on the floor 18 of the intermediate bridge sections 14. Each bracket 26 also supports a guide roller 30 which is mounted thereto for rotation about a vertical axis. The guide rollers 30 are mounted to their respective brackets 26 by means of bolts 32 and thus the vertical position of each guide roller 30 may be independently adjusted. The guide rollers 30 are respectively positioned to be in rolling contact with the inner surfaces of the opposite side walls 22 of the intermediate bridge section 14 for ensuring alignment of the terminal and intermediate bridge sections 12 and 14 during retraction and extension of the telescopic boarding bridge 10.

Figure 3:
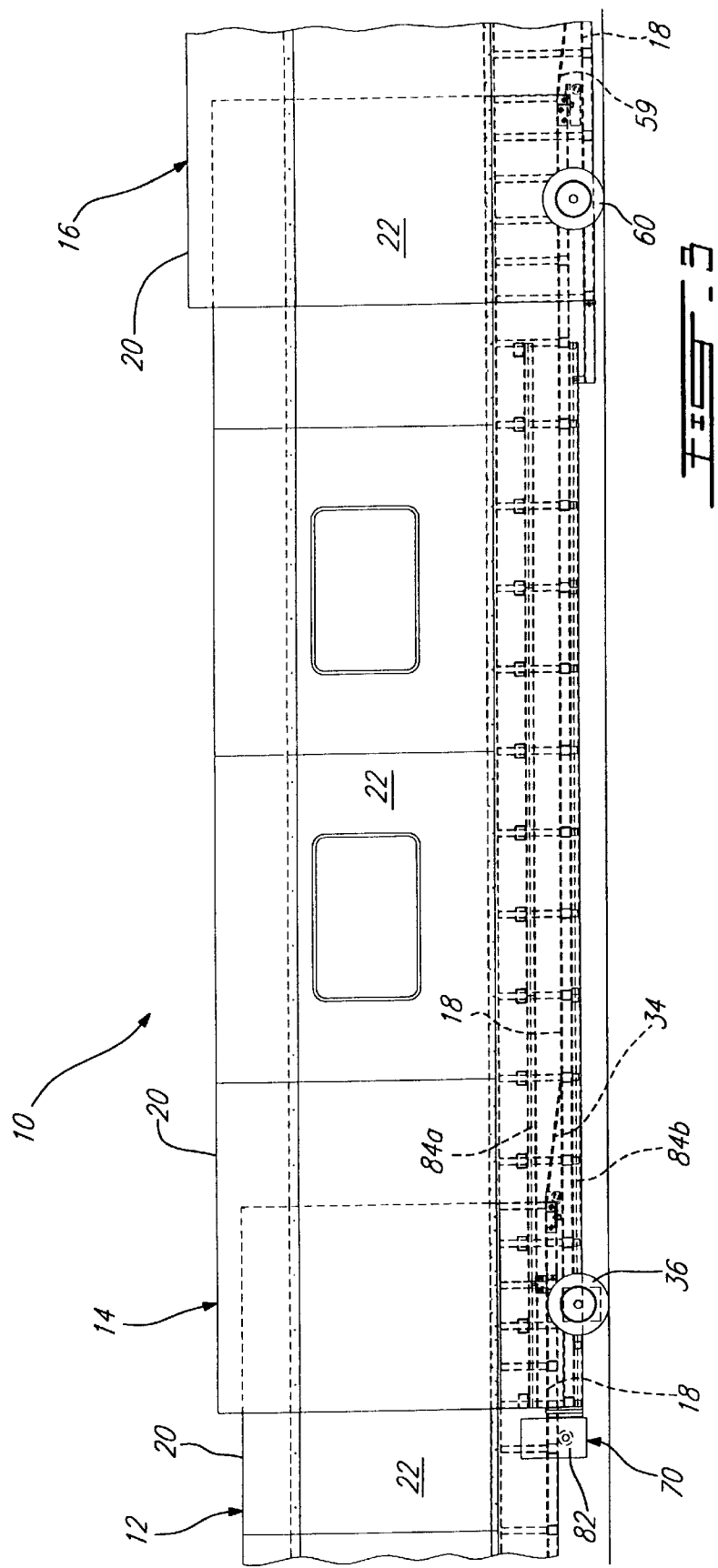
FIG. 3 is an enlarged side elevational view of the telescopic boarding bridge in the extended position thereof.

As shown in FIG. 3, a gently sloping ramp 34 is hingedly secured to a front edge of the floor 18 of the terminal bridge section 12 for providing a transition between the floors 18 of the terminal and intermediate bridge sections 12 and 14.

It is noted that additional modular fixed walkways can be connected to the rear end of the terminal bridge section 12 to accommodate airport layout that requires longer distances between the terminal door and the aircraft parking location.

Referring now to FIGS. 1 to 6, the rear end of the intermediate bridge section 16 is supported on the ground through a pair of wheels 36 laterally mounted on opposite sides of the intermediate bridge section 14. More particularly, each wheel 36 is rotatably mounted on an idler shaft 38 extending outwardly from one side of the intermediate bridge section 14.

Figure 2:
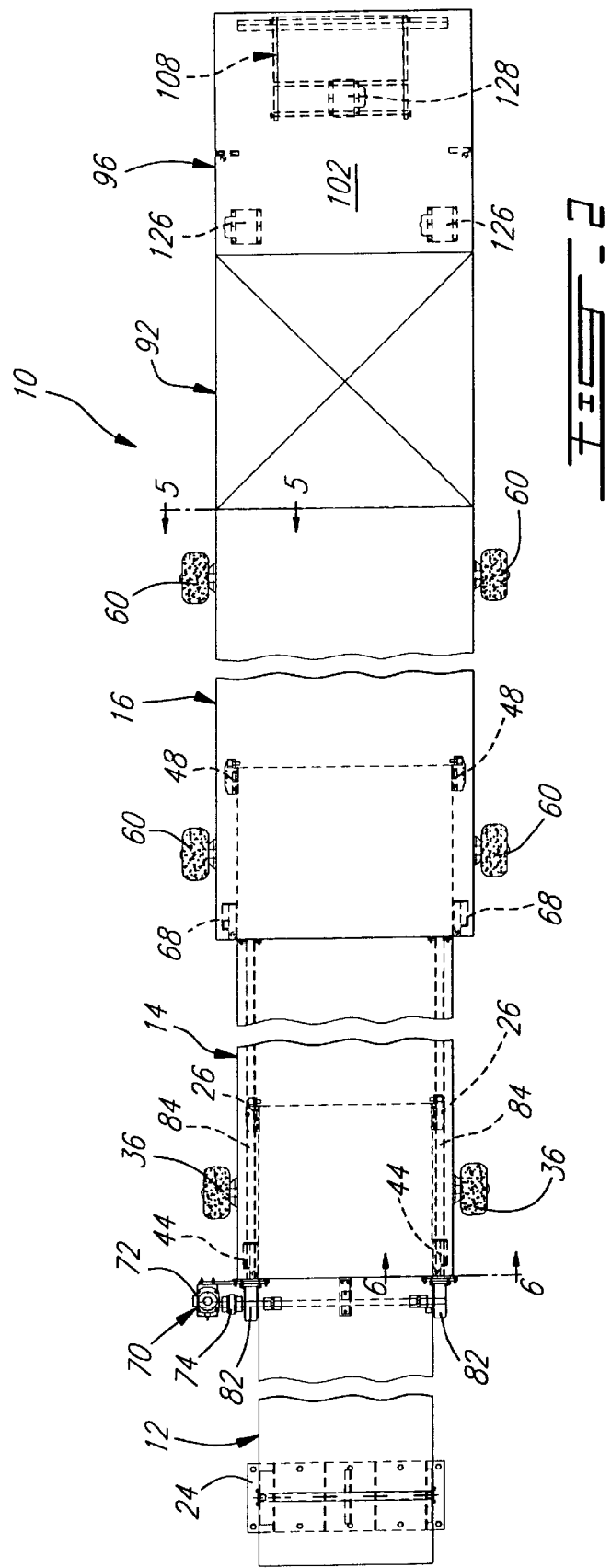
FIG. 2 is a top plan view of the telescopic boarding bridge of FIG. 1 shown in an extended position thereof and provided at a front end thereof with a front end section adapted to support a retractable and extendable canopy enclosure.

As seen in FIGS. 2 and 6, the intermediate bridge section 14 is provided at rear end thereof with two spaced-apart guide rollers 40 positioned on a transversal axis relative to a longitudinal axis of the telescopic boarding bridge 10 for respectively engaging opposite side walls 22 of the terminal bridge section 12. Each guide roller 40 is rotatably mounted to a vertically extending threaded pin 42 threadeably engaged with a bracket 44 secured to the floor 18 of the intermediate bridge section 14. Guide rollers 40 along with guide rollers 30 ensure that the terminal and intermediate bridge sections 12 and 14 remain in line during extension and retraction of the telescopic boarding bridge 10.

As seen in FIGS. 4 and 5, the front end of the intermediate bridge section 14 is supported on the floor 18 of the front bridge section 16 by a pair of rollers 46 respectively mounted to a pair of brackets 48 secured to opposite sides of the intermediate bridge section 14. Each roller 46 is rotatably mounted to a horizontally extending threaded pin 50 passing through a hole defined in the corresponding bracket 48. The threaded pins 50 are respectively secured to the brackets 48 by two nuts 52.

Each bracket 48 further supports a guide roller 54 mounted thereto for rotation about a vertical axis. The guide rollers 54 are respectively rotatably mounted on vertically extending threaded pins 56 secured to the brackets 48 by means of nuts 58. The guide rollers 54 are positioned to engage inner surfaces of the opposite side walls 22 of the front bridge section 16 to ensure alignment of the intermediate and front bridge sections 14 and 16 during extension and retraction of the telescopic boarding bridge 10.

A gently sloping ramp 59, as shown in FIG. 3, is hingedly secured to a front edge of the floor 18 of the intermediate bridge section 14 for providing a transition between the floors 18 of the intermediate and front bridge sections 14 and 16.

As best seen in FIGS. 2 and 5, two pairs of wheels 60 are laterally mounted to the front bridge section 16 to support the same on the ground. Each wheel 60 is rotatably mounted on an idler shaft 62 extending outwardly from a side of the front bridge section 16.

The front bridge section 16 is provided at a rear end thereof with two spaced-apart guide rollers 64 positioned on a transversal axis relative to the longitudinal axis of the telescopic bridge 10 for respectively engaging opposite side walls 22 of the intermediate bridge section 14. Each guide roller 64 is rotatably mounted to a vertically extending threaded pin 66 threadeably engaged with a bracket 68 secured to the floor 18 of the front bridge section 16. The guide rollers 54 of the intermediate bridge section 14 along with the guide rollers 64 of the front bridge section 16 force the intermediate and front bridge sections 14 and 16 to move in a straight line during extension and retraction of the telescopic boarding bridge 10.

By not driving the wheels 36 and 60 of the intermediate and front bridge sections 14 and 16 and by mounting them on independent idler shafts 38 and 62 extending laterally from the sides of bridge sections 14 and 16, as explained hereinbefore, it is possible to minimize the elevation of the floor 18 of the boarding bridge 10 relative to the airport tarmac and still have larger wheels to clear ramp obstacles such as snow and ice. Indeed, as the pairs of wheels 36 and 60 are not the driving force of the telescopic boarding bridge 10, it is not necessary that they be connected to common shafts extending under the bridge.

As commuter type aircraft are generally equipped with stairs that swing downwardly near ground level, it is important to minimize the elevation of the floors 18 of the telescopic boarding bridge 10 such as to provide a surface substantially level with the bottom of the aircraft stairs for passengers to step on, thereby preventing them from walking on the airport tarmac.

The telescopic boarding bridge 10 is provided with a drive mechanism 70 which is operational to selectively push and pull on the terminal, intermediate and front bridge sections 12, 14 and 16 to displace the telescopic boarding bridge 10 between a retracted position and an extended position.

More particularly, as shown in FIGS. 2, 3 and 7, the drive mechanism 70 is mounted to the intermediate bridge section 14 and includes a drive motor 72 driving a gear box 74 coupled to a drive shaft 76 on which two spaced apart sprockets 78 are installed for respectively driving two chains 80 mounted on opposite sides of the intermediate bridge section 14 and fixedly connected at a first end thereof to a front end of the terminal bridge section 12 and at a second end thereof to a rear end of the front bridge section 16. Each sprocket 78 is housed in a weatherproof boxes 82 for protecting it from the elements.

It is noted that the drive motor 72 is reversible for driving the chains 80 in either direction depending upon whether it is desired to retract or extend the telescopic boarding bridge 10.

As seen in FIGS. 4 to 7, each chain 80 has opposite sections slidably engaged within a pair of longitudinal and parallel guide chains 84 respectively mounted to one side of the intermediate bridge section 14 above and under a bottom structure thereof. More specifically, each pair of guide chain 84 includes a first guide member 84a mounted to an inner surface of one side wall 22 of the intermediate bridge section 14 and a second guide member 84b mounted to an underside surface of the bottom structure of the intermediate bridge section 14.

Accordingly, each chain 80 is routed under the bottom structure of the intermediate bridge section 14, in a guide member 84b, and is connected to the rear end of the front bridge section 16. The other end portion of each chain 80 is routed above the floor 18 of the intermediate bridge section 14, in a guide member 84a, and is fixedly connected to the front end of the terminal bridge section 12.

The chains 80 have rollers 86 on each side thereof for supporting them on the bottom side surfaces of the guide chains 84. Each guide chain 84 has a C-shaped cross-section which is adapted to ensure slidability of the chain 80 in the guide 84 while preventing lateral deflection of the chain 84 therein to thus enable the same to impart a movement to the intermediate and front bridge sections 14 and 16 by way of a pulling action or of a pushing action. Each guide chain 84 is provided with a longitudinal rib 88 projecting downwardly from an upper side thereof for further restricting the deflection of a chain engaged within the guide chain 84.

As shown in FIG. 7, the links of each chain 80 are provided with cooperating abutment surfaces 90a and 90b which enable the chains 80 to become as rigid when thrusting as when pulling.

In operation, the actuation of the drive motor 72 produces the rotation of the sprocket wheels 78 and thus the longitudinal displacement of the chains 80. Accordingly, the intermediate and front bridge sections 14 and 16 are simultaneously moved in the same direction as that of the chains 80.

More specifically, as the drive motor 72 operates in one direction, the chains 80 are either pushed at the top and pulled at the bottom, or vise versa, depending on the direction of rotation of the drive motor 72. For instance, assume the drive motor 72 rotates the drive shaft 76 such that the portions of the chains 80 located above the floor 18 of the intermediate bridge section 14 are creating thrust forces between the intermediate and terminal bridge sections 14 and 12 and pulling forces between the intermediate and front bridge sections 14 and 16. The thrust forces between the intermediate and terminal bridge sections 14 and 12 will force the rear end of the intermediate bridge section 14 to move away from the front end of the terminal bridge section 12. Since the terminal bridge section 12 is supported in fixed position, only the intermediate bridge section 14 can move. Accordingly, the intermediate bridge section 14 will be displaced toward the rear end of the terminal bridge section 12 at a speed directly proportional to the rotation speed of the drive motor 72.

While the intermediate bridge section 14 is moving relative to the terminal bridge section 12, the front bridge section 16 is pulled back toward the rear end of the terminal bridge section 12 as it retracts over the intermediate bridge section 14. The movement of the front bridge section 16 relative to the intermediate bridge section 14 will be at the same speed as the movement of the intermediate bridge section 14 relative to the terminal bridge section 12. This provides a relative movement of the front bridge section 16 to the terminal bridge section 12 at twice the speed of the intermediate bridge section 14 relative to the terminal bridge section 12.

When the direction of rotation of the drive motor 72 is reversed, the intermediate and front bridge sections 14 and 16 will move based on the principals described above, but in the opposite direction.

By having the drive mechanism mounted to the intermediate bridge section 14 instead of mounted to the terminal bridge section 12, the front bridge section 16 relative to the terminal bridge section 12 moves at twice the speed as the speed of the intermediate bridge section 14 relative to the front bridge section 16 or as that of the intermediate bridge section 14 relative to the terminal bridge section 12. Reducing the speed of drive rotation reduces the horsepower required for any given extension or retraction speed of the telescopic boarding bridge 10.

The presence of the two sprocket wheels 78 and the two chains 80 driven by a common drive shaft 76 provides even and properly aligned contraction and extension movements of the bridge sections 12, 14 and 16 with respect to each other. Indeed, both chains 80 will always push or pull at the same speed with no slippage, thereby forcing the terminal, intermediate and front bridge sections 12, 14 and 16 to be self-aligning during extension and retraction of the telescopic boarding bridge 10.

The above described drive mechanism 70 allows for slippage of the wheels 36 and 60 on snow or ice and still permit the telescopic boarding bridge 10 to extend and retract in a linear direction, thereby preventing cocking or racking the bridge sections 12, 14 and 16.

When power is removed from the drive motor 70, a brake (not shown) on the motor is automatically set which prohibits bridge movement. The motor brake (not shown) can be manually released if it is necessary to move the telescopic boarding bridge 10 back away from the aircraft when power is disconnected or not available.

Travel limit switches (not shown) are provided for limiting the forward and backward movements of the intermediate and front bridge sections 12 and 14. Additional limit switches (not shown) are also provided to cause the intermediate and front bridge sections 14 and 16 to automatically slow down near the extreme limits of travel thereof.

The telescopic boarding bridge 10 is controlled by a programmable logic controller. A control panel (not shown) is located at the front end of the front bridge section for operating the telescopic boarding bridge 10.

As seen in FIGS. 1, 2 and 8 the front bridge section 16 is provided at its front end with a cab 92 which has at a front end thereof and at opposite sides thereof a plurality of folding doors 94. The folding doors 94 have windows to provide the operator with better visibility when driving the telescopic boarding bridge 10. The cab 92 is adapted to be connected to a front end section 96 comprising a canopy enclosure 98 which is displaceable between a retracted position and extended position for moving into and out of engagement with the fuselage F of a small aircraft. The front end section 96 may be mounted to the front end of the cab 92 such as to be in line with the telescopic boarding bridge 10 or, alternatively, to one side thereof such as to extend at 90 degrees with respect to a longitudinal axis of the telescopic boarding bridge 10, as shown in FIG. 8.

Generally, the front end section is mounted in line with the telescopic boarding bridge 10 to mate with small aircraft that park parallel to the airport terminal wall, whereas the cabs 92 is mounted at 90 degrees thereto to mate with aircraft that are parked pointing into the terminal.

The cab 92 may also be connected on one side thereof to a luggage portal walkway section to facilitate loading and unloading luggage from the aircraft.

As shown in FIGS. 9 and 10, the front end section 96 includes two opposite side walls 99 and a forward bottom extension 100 protruding in front of the side walls 99 for receiving the stairs S of a small aircraft. This effectively increases the length of the telescopic boarding bridge 10 without affecting the aircraft wing tip clearance. Because the telescopic boarding bridge 10 is mounted at ground level, the wing of the aircraft can never touch the longest portion of the telescopic boarding bridge 10 that will come in contact with the aircraft stairs S, thereby reducing the extension required to mate to the aircraft. It is noted that the forward bottom extension 100 is about seven feet wide to allow for aircraft miss-parked.

The side walls 99 of the front end section 96 support a roof 102 which has a projecting portion which extend over the forward bottom extension 100. The elevation of the roof 102 relative to the airport tarmac is higher than that of commuter type aircraft and thus it does not affect the wing clearance provided by the forward bottom extension 100.

As seen in FIGS. 8, a pair of longitudinal and parallel trackways 104 are mounted to the roof 102 for cooperating with rollers 106 of a carrier member 108 to slidingly connect the same to the roof 102.

The carrier member 108 is provided on each side thereof with a downwardly extending holding member 110. Three rib elements 112 are respectively pivotally mounted at opposed ends thereof to the lower ends of the holding members 110 for vertical swinging movements about horizontal axes. Each rib element 112 includes two arcuate members 114 connected at upper ends thereof by a transversal member 116. The rib elements 112 provide structural support for the canopy enclosure 98 which is fitted thereon.

As seen in FIGS. 9 to 11, the canopy enclosure 98 includes curtains 118 which are mounted to the carrier member 108 and to the rib elements 112 for covering the doorway and the sides of the stairs S of a small aircraft when the canopy enclosure 98 is in an extended position thereof. The rib elements 112 are connected to the curtains 118 at different locations on a longitudinal axis of the canopy enclosure 98 for assisting the deployment thereof. The curtains 118 are assembled to two lateral air bags 120 and to a central air bag 122 attached at one end thereof to a supporting plate 124 secured to a front end of the carrier member 108.

A pair of lateral blowers 126 are respectively mounted to the rear end of the roof 102 for inflating the two lateral air bags 120 and at the same time cause the displacement of the carrier member 108 toward a front end of the roof 102.

A central blower 128 is mounted to the carrier member 108 and is operational to inflate the central air bag 122 once the carrier member 108 as been displace to its forward position to cause the deployment of the canopy enclosure 98, as seen in FIG. 10.

As shown in FIG. 9, the canopy enclosure 98 is normally urged in a retracted position thereof by means of springs 130. More particularly, a spring 130a is mounted to the supporting plate 124 and connected to the canopy enclosure 98 for swinging the same away from the fuselage of an aircraft when power is removed from the central blower 128. Additional springs 130b are mounted on each side of the canopy enclosure 98 to assist the spring 130a in its function and to displace the carrier member 108 away from the front end of the roof 102 when power is removed from the lateral blowers 126. Each spring 130b is secured at one end thereof to one side wall 99 of the front end section 96 and at opposed end thereof to a front portion of the canopy enclosure 98.

One interesting advantage of the above described biasing mechanism is that in the event of a power failure, the canopy enclosure will be automatically disengaged from the fuselage of the aircraft, thereby enabling the aircraft to be moved away from the telescopic boarding bridge 10.

Instead of the springs 130, it is also contemplated to utilize straps rolled upon spring loaded rollers.

However, it is understood that other means, such as motorized rollers, may be provided for moving the canopy enclosure 98 back to its retracted position. A counterweighted pulley system has also been contemplated In operation, the telescopic boarding bridge 10 is first extended to place the bottom forward extension 100 in an appropriate position for receiving the stairs S of a commuter type aircraft. Thereafter, the lateral blowers 126 are activated to inflate the lateral air bags 120 and displace the carrier member 108 to its forward position. It is understood that the motive forces generated by the lateral blowers 126 are greater than the biasing forces exerted by the springs 130b. Once the carrier member 108 has been displaced to the front end of the roof 102, the central blower 128 is activated to inflate the central air bag 122 and thus cause the deployment of the canopy enclosure 98. In its extended or deployed position, the canopy enclosure 98 mates with the fuselage of the aircraft for covering the hatch or doorway and the sides of the stairs S thereof, whereby the aircraft door can be opened into a protected environment. The passengers step from the aircraft stairs S directly onto the forward bottom extension 100 of the front end section 96 of the telescopic boarding bridge 10.

It is noted that although the telescopic boarding bridge 10 of the present invention has been described with two moveable boarding bridge sections, namely the intermediate and front bridge section 14 and 16, only one moveable bridge section could be used, especially, in situations where the maximization of the retraction and extension distances is of much less importance.

We claim:

1. A telescopic boarding bridge for bridging, at ground level, the space between a doorway of a small aircraft and a terminal gate doorway, comprising a terminal bridge section supported in a stationary position adjacent said gate doorway, at least one moveable bridge section telescopically related to said terminal bridge section and displaceable in a linear direction between extended and retracted positions, said moveable bridge section being only supported on a ground surface by idler runner means to enable said linear displacement thereof at a level proximal the ground surface, and drive means operational to selectively push and pull said moveable bridge section relative to said terminal section to effect extension and retraction thereof.

2. A telescopic boarding bridge as defined in claim 1, wherein said at least one moveable boarding bridge section includes an intermediate bridge section and a front bridge section, said intermediate bridge section being telescopically mounted to said terminal bridge section and said front bridge section being telescopically mounted to said intermediate bridge section. on a floor of said intermediate and front bridge sections.

3. A telescopic boarding bridge as defined in claim 2, wherein said intermediate and front bridge sections respectively telescopically receive front end portions of said terminal bridge section and of said intermediate bridge section, and wherein said idler runner means include a first pair of idler wheels laterally mounted at a rear end portion of said intermediate bridge section, and second and third pairs of idler wheels laterally mounted at rear and front end portions of said front bridge section, respectively.

4. A telescopic boarding bridge as defined in claim 3, wherein roller means are provided for respectively supporting said front end portions of said terminal and intermediate bridge sections on a floor of said intermediate and front bridge sections respectively.

5. A telescopic boarding bridge as defined in claim 3, wherein said terminal, intermediate and front bridge sections are each provided with side walls having inner and outer surfaces, and wherein guide roller means are mounted externally of said front end portions of said terminal and intermediate bridge sections on opposite sides thereof, said guide roller means of said terminal and intermediate bridge sections being positioned for rolling contact with said inner surfaces of said side walls of said intermediate and front bridge sections, respectively, thereby ensuring sufficient alignment of said terminal, intermediate and front bridge sections during extension and retraction of said telescopic boarding bridge.

6. A telescopic boarding bridge as defined in claim 5, wherein additional guide roller means are mounted internally of said rear end portions of said intermediate and front bridge sections on opposite sides thereof, said additional roller means of said intermediate and front bridge sections being positioned for rolling contact with said outer surfaces of said side walls of said terminal and intermediate bridge sections, respectively.

7. A telescopic boarding bridge as defined in claim 2, wherein said drive means is mounted to said intermediate bridge section and includes at least two axially extending elongated channel means mounted to said intermediate bridge section on opposite sides thereof, at least two push-pull flexible elongated drive members respectively adapted to be slidably engaged in said at least two elongated channel means for longitudinal movement therein while being restrained by said elongated channel means to prevent lateral deflection of said push-pull flexible elongated drive members, each said push-pull flexible elongated drive member being connected at a first end portion thereof to said terminal bridge section and at a second end portion thereof to said front bridge section,. and motor means connected to said push-pull flexible elongated drive members for simultaneously and equally displacing said push-pull flexible elongated drive members thereby forcing a linear movement of said intermediate and front bridge sections in a direction dependent on that of said motor means.

8. A telescopic boarding bridge as defined in claim 7, wherein said motor means includes a reversible motor driving a shaft on which at least two sprocket means are mounted at spaced-apart locations for respectively engaging said at least two push-pull flexible elongated drive members.

9. A telescopic boarding bridge as defined in claim 8, wherein each said push-pull flexible elongated drive member includes a chain.

10. A telescopic boarding bridge as defined in claim 9, wherein each said chain is provided on opposite side thereof with roller means for supporting said chain in said elongated channel means.

11. A telescopic boarding bridge as defined in claim 9, wherein each said chain includes links which are provided with cooperating abutment means for restricting said links from pivoting with respect to each other.

12. A telescopic boarding bridge as defined in claim 7, wherein each said elongated channel means includes first and second channel portions respectively extending above and under a floor level of said intermediate bridge section, said first and second channel portions being respectively adapted to slidably receive said first and second end portions of one of said push-pull flexible elongated drive members.

13. A telescopic boarding bridge as defined in claim 7, wherein each said elongated channel means has a C-shaped cross-section which is slightly larger than that one of said push-pull flexible elongated members, thereby ensuring slidability of said push-pull flexible elongated drive member in said elongated channel means while preventing lateral deflection of said push-pull flexible elongated drive member therein.

14. A telescopic boarding bridge as defined in claim 3, wherein each idler wheel of said first, second and third pairs of wheels is rotatably mounted to a distinct horizontal idler shaft means.

15. A telescopic boarding bridge as defined in claim 1, wherein said terminal and moveable bridge sections are made of steel and composite fiberglass panels.

16. A telescopic boarding bridge as defined in claim 1, wherein said moveable boarding bridge section is provided at a front end portion thereof with a forward bottom extension for enabling a door, containing a set of stairs, of the small aircraft to be swung down on said forward bottom extension, thereby reducing the distance to mate with the small aircraft and providing extra wing tip clearance.

17. A telescopic boarding bridge as defined in claim 16, wherein said front end portion of said moveable boarding bridge includes a canopy enclosure displaceable between a retracted position for providing increase wing clearance and an extended position for covering door opening and stairs of the small aircraft.

18. A telescopic boarding bridge as defined in claim 1, wherein said telescopic boarding bridge includes a modular entry bridge section adapted to be selectively mounted in one of an in line and a right angle position relative to a front portion of said moveable bridge section.

19. A telescopic boarding bridge as defined in claim 18, wherein door means are provided at front and opposite sides of said front portion of said moveable bridge sections.

20. In a telescopic boarding bridge having a terminal bridge section supported in a stationary position, an intermediate bridge section mounted in a telescopically mating relationship with said terminal bridge section, and a front bridge section mounted in telescopically mating relationship with said intermediate bridge section; a drive assembly mounted to said intermediate bridge section for retracting and extending said telescopic boarding bridge in a linear direction, said drive assembly comprising at least one axially extending elongated channel means mounted to said intermediate bridge section, at least one push-pull flexible elongated drive member adapted to be slidably engaged in said elongated channel means for longitudinal movement therein, said push-pull flexible elongated drive member being connected at a first end portion thereof to said terminal bridge section and at a second end portion thereof to said front bridge section, and motor means connected to said push-pull flexible elongated drive member for displacing said push-pull flexible elongated drive member thereby forcing a linear movement of said intermediate and front bridge sections in a direction dependent on that of the motor means.

21. A telescopic boarding bridge as defined in claim 20, wherein said drive assembly comprises two axially extending elongated channel means mounted to said intermediate bridge section on opposite sides thereof, and two push-pull flexible elongated drive members respectively adapted to be slidably engaged in said two elongated channel means, said motor means being mounted to said intermediate bridge section for simultaneously and equally driving said push-pull elongated drive members.

* * * * *